United States Patent
Komuro et al.

(10) Patent No.: US 6,622,954 B2
(45) Date of Patent: Sep. 23, 2003

(54) COIL WINDER AND WIRE WINDING METHOD

(75) Inventors: Katsurou Komuro, Saitama (JP); Yuuji Koganezawa, Saitama (JP)

(73) Assignee: Nittoku Engineering Kabushiki Kaisha, Saitama (JP)

(*) Notice: Subject to any disclaimer, the term of this patent is extended or adjusted under 35 U.S.C. 154(b) by 42 days.

(21) Appl. No.: 10/035,106

(22) Filed: Jan. 7, 2002

(65) Prior Publication Data
US 2002/0088892 A1 Jul. 11, 2002

(30) Foreign Application Priority Data
Jan. 9, 2001 (JP) .......................... 2001-001522

(51) Int. Cl.⁷ .......................... B65H 23/06; B65H 77/00
(52) U.S. Cl. .................. 242/432.2; 242/432.5
(58) Field of Search ............... 242/432.2, 432.3, 242/432.4, 432.5, 434.5

(56) References Cited

U.S. PATENT DOCUMENTS

| | | | | |
|---|---|---|---|---|
| 3,460,770 A | * | 8/1969 | Eminger | 242/432.4 |
| 4,913,362 A | * | 4/1990 | Koizumi | 242/432.5 |
| 4,991,782 A | * | 2/1991 | Luciani | 242/432.4 |
| 6,003,805 A | * | 12/1999 | Newman | 242/432.5 |
| 6,032,897 A | * | 3/2000 | Ponzio | 242/432.4 |
| 6,098,912 A | * | 8/2000 | Noji | 242/432.5 |
| 6,254,027 B1 | * | 7/2001 | Kunou | 242/432.4 |
| 6,533,208 B1 | * | 3/2003 | Becherucci et al. | 242/432.4 |

FOREIGN PATENT DOCUMENTS

JP 2000-175415 6/2000

* cited by examiner

*Primary Examiner*—Emmanuel Marcelo
(74) *Attorney, Agent, or Firm*—Rabin & Berdo, P.C.

(57) ABSTRACT

This invention provides a coil winder which can shorten the time required to wind coils. The coil winder has a nozzle for feeding out a wire, a stator support base, a head for supporting the nozzle free to move radially relative to the rotation axis of the stator support base, a head support shaft which supports the head and extends axially, a head support shaft displacement mechanism for moving the head support shaft to and fro axially, a head support shaft rotating mechanism for rotating the head support shaft around the axis, a traverse shaft which passes through the head support shaft, a traverse shaft rotating mechanism for rotating the traverse shaft, and a nozzle displacement device for displacing the nozzle radially relative to the axis due to the relative rotation of the traverse shaft with respect to the head support shaft. Motors provided for the head support shaft rotating mechanism and the traverse shaft rotating mechanism are supported by a frame.

5 Claims, 4 Drawing Sheets

COIL WINDER AND WIRE WINDING METHOD

FIELD OF THE INVENTION

This invention relates to improvement of a coil winder and a wire winding method for manufacturing the stator coil of an inner rotor type motor.

BACKGROUND OF THE INVENTION

Tokkai 2000-175415 published by the Japanese Patent Office in 2000 discloses a coil winder comprising a wire guide tube which moves to and fro along the center axis of a stator and rotates bi-directionally around the center axis, a head fixed to this guide wire tube at its tip, and a cam plate for moving nozzles radially relative to the head. In this apparatus, the wire is wound in alignment by moving a nozzle around the magnetic core of a stator, and moving the nozzle radially, in short perpendicular to the center axis.

SUMMARY OF THE INVENTION

However, in the prior art, as a motor for driving the cam plate of the nozzle displacement device is attached to the head, the weight of the head part becomes large. For this reason, the traveling speed of the head is slow, and the working time required to wind the wire is long in the prior art apparatus.

Moreover, as the motor moves together with the head, there was also a problem in that the electric leads for energizing the motor easily became disconnected.

It is therefore an object of this invention to provide a coil winder and wire winding method which permit shortening of the working time required to wind wire.

It is another object of this invention to provide a coil winder and coil winding method in which the motor does not move together with the head.

In order to achieve above objects, this invention provides a coil winder comprising a frame, a nozzle for supplying a wire, a head for supporting the nozzle in such a manner that the nozzle can move radially relative to the rotation axis of the head, a head support shaft which supports the head and extends in the rotation axis direction, a head support shaft displacement mechanism which causes the head support shaft to moves to and fro in the rotation axis direction relative to the frame, a first rotating mechanism which rotates the head support shaft around the rotation axis, a traverse shaft which rotates relative to the head support shaft, a second rotating mechanism which rotates the traverse shaft around the rotation axis, and a nozzle displacement device which moves the nozzle radially relative to the rotation axis due to the relative rotation of the traverse shaft to the head support shaft.

The first rotating mechanism comprises a first motor supported by the frame, and the second rotating mechanism comprises a second motor supported by the frame.

Further, this invention provides a wire winding method of a coil winder, the coil winder having a frame, a nozzle for feeding out a wire, a head for supporting the nozzle free to move radially relative to the rotation axis of the head, a head support shaft which supports the head and extends in the rotation axis direction, the head support shaft being rotated by the rotation of a first motor supported by the frame, a head support shaft displacement mechanism for moving the head support shaft to and fro in the rotation axis direction relative to the frame, a traverse shaft which rotates relative to the head support shaft, the traverse shaft being rotated by the rotation of a second motor supported by the frame, and a nozzle displacement device which moves the nozzle radially relative to the rotation axis due to the relative rotation of the traverse shaft with respect to the head support shaft.

The wire winding method comprises holding the tip of the wire fed out from the nozzle, axially moving the head downwards, rotating the head support shaft and traverse shaft at the same speed in a first direction, axially moving the head upwards, rotating the head support shaft and traverse shaft at the same speed and in the opposite direction to the first direction, and rotating the traverse shaft with the head support shaft stopped so as to move the nozzle radially relative to the rotation axis.

The details as well as other features and advantages of this invention are set forth in the remainder of the specification and are shown in the accompanying drawings.

DESCRIPTION OF THE PREFERRED EMBODIMENTS

Figure 1:
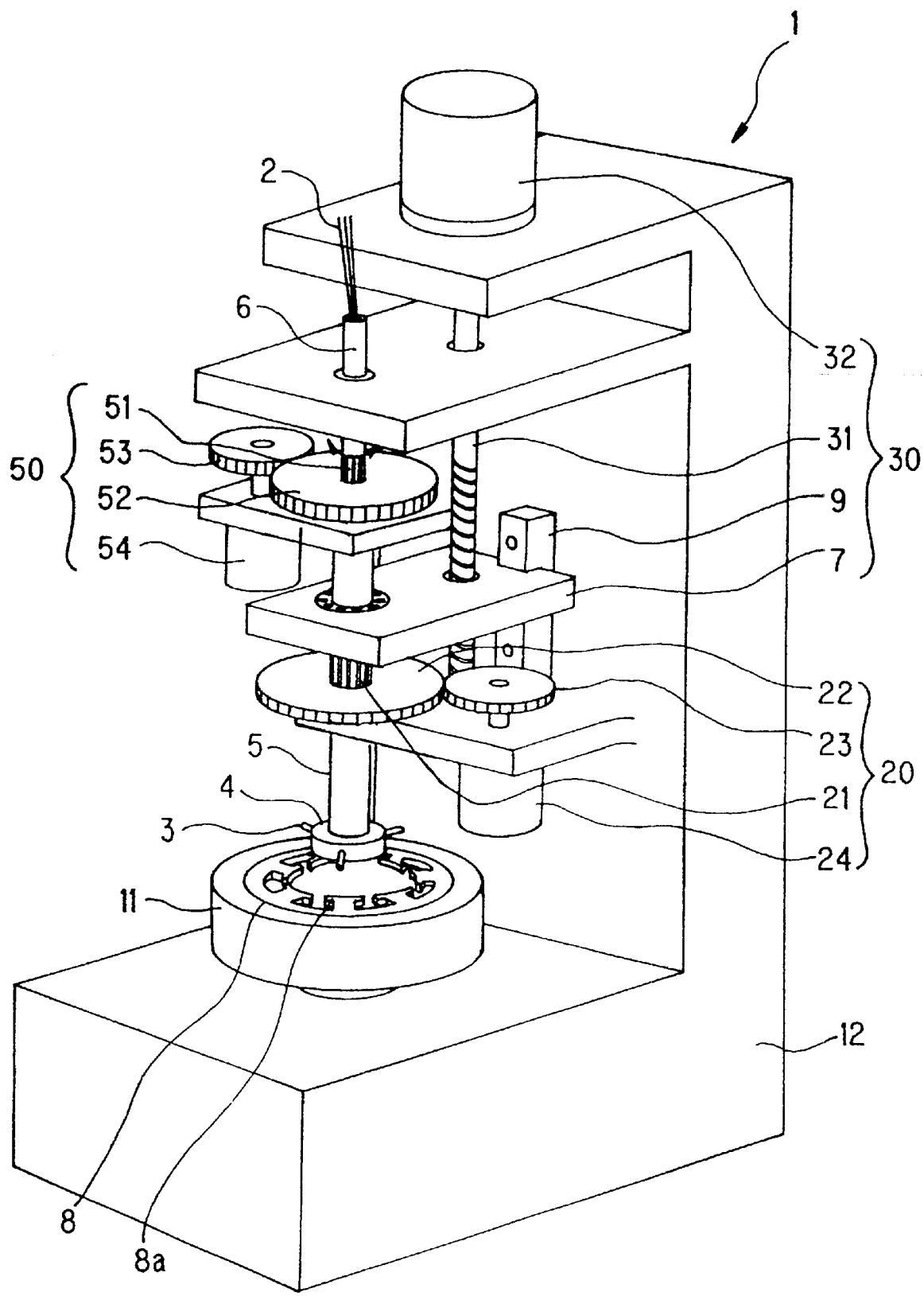
FIG. 1 is a perspective view of a coil winder according to an embodiment of this invention.
Figure 2:
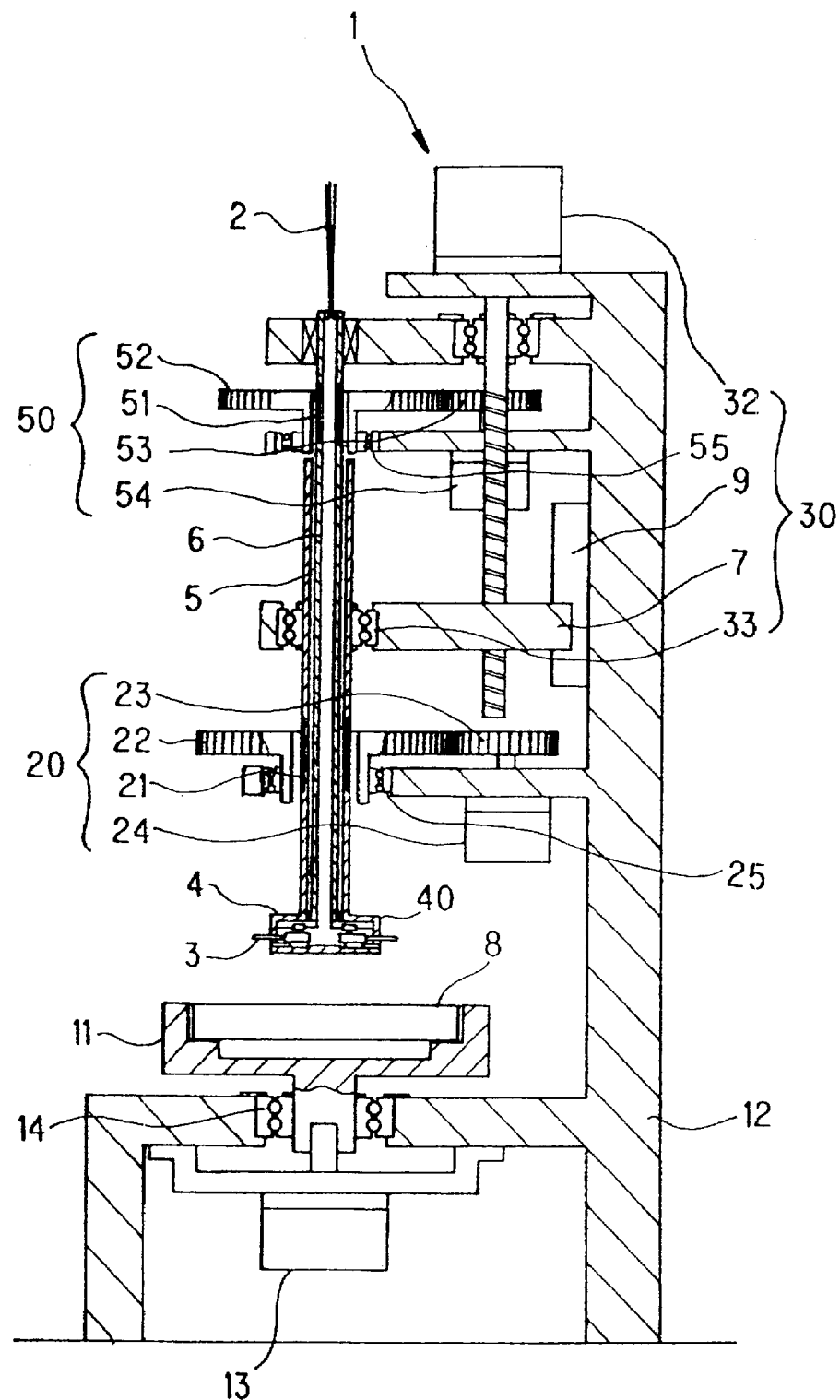
FIG. 2 is a sectional view of the coil winder according to the embodiment of this invention.

A coil winder which automatically manufactures the stator coil of an inner rotor type motor according to this invention will now be described referring to FIGS. 1 and 2. A coil winder 1 comprises a stator support base 11 which supports a stator 8 on a frame 12, and an indexing motor 13 which rotates the stator support base 11.

The stator 8 has plural cores (teeth) 8a which are radially arranged and project toward the center of the stator, and a stator coil is formed by winding a wire 2 around each core 8a. The stator support base 11 can be rotated relative to the frame 12, and is supported via a bearing 14. Here, the rotation axis (namely, center axis) of the stator support base 11 coincides with the rotation axis of the head 4 and the center of the stator, and is taken as the Z axis.

The coil winder 1 comprises three nozzles 3 for feeding out the wire 2, a head 4 for supporting each of these nozzles 3, a cylindrical head support shaft 5 for supporting the head 4, a head support shaft rotating mechanism 20 for rotating the head support shaft 5 around the Z axis, that is, around the rotation axis of the head, and a head support shaft displacement device 30 for moving the head support shaft 5 to and fro in the Z axis direction. Each of the nozzles 3 rotates around one of the cores 8a.

The head support shaft rotating mechanism 20 comprises a spline 21, gear 22, pinion 23, and a head support shaft rotation motor 24. The spline 21 is cut into the outer circumference of the head support shaft 5. A gear 22 is connected to the head support shaft 5 by a spline connection, the head support shaft 5 being axially slidable relative to the gear 22. The gear 22 also meshes with a pinion 23. A head support shaft rotation motor 24 rotates the pinion 23. The rotation of a head support shaft rotation motor 24 is transmitted to the head support shaft 5, so the head 4 rotates. The head support shaft rotation motor 24 is fixed to the frame 12. On the other hand, the gear 22 is supported by the frame 12 via a bearing 25 so that it meshes with the pinion 23.

Thus, the head support shaft rotating mechanism 20 has a configuration wherein the rotation of the head support shaft rotation motor 24 is transmitted to the head support shaft 5 via the gear 22 with which the spline 21 of the head support shaft 5 slidably engages. Hence, the head support shaft rotation motor 24 can be supported by the frame 12, and the moving mass containing the head 4 can be largely reduced.

The head support shaft displacement device 30 comprises a moving base 7 which supports the head support shaft 5 in such a manner that the head support shaft 5 can rotate around the Z axis via a bearing 33, a guide rail 9 supporting this moving base 7 which permits movement of the moving base 7 in the Z axis direction relative to the frame 12, a ball screw 31 which engages with the moving base 7, and a head support shaft displacement motor 32 which rotates the ball screw 31.

The head support shaft displacement motor 32 is fixed to the frame 12, the moving base 7 goes up and down due to the rotation of the ball screw 31 by the head support shaft displacement motor 32, and the head 4 joined to the head support shaft 5 is thus given a translation parallel to the Z axis.

The coil winder 1 is equipped with a nozzle displacement device 40 which moves the nozzle 3 substantially radially relative to the Z axis, and winds the wire 2 around the core 8*a* in alignment.

Figure 3:
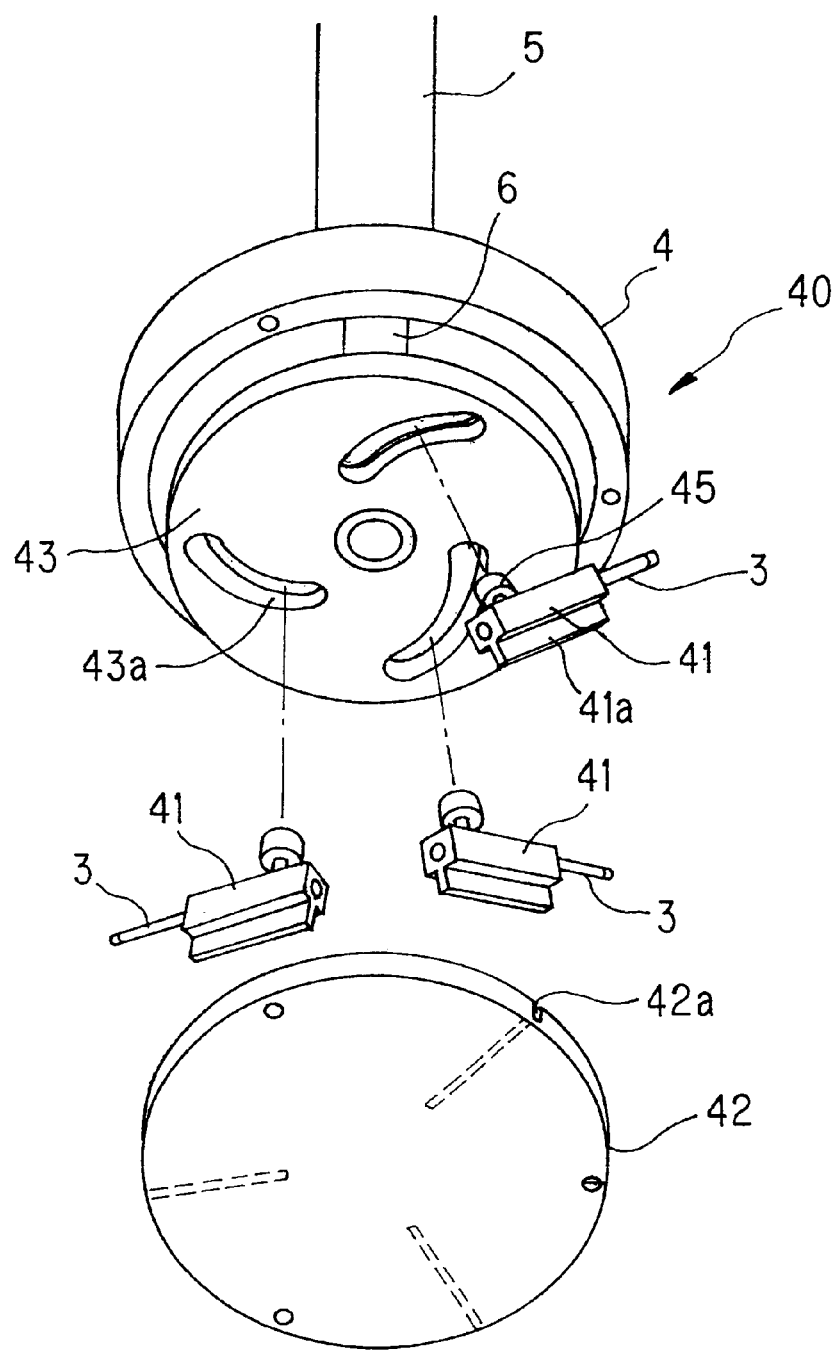
FIG. 3 is a cutaway perspective view of a nozzle displacement device according to the embodiment of this invention.
Figure 4:
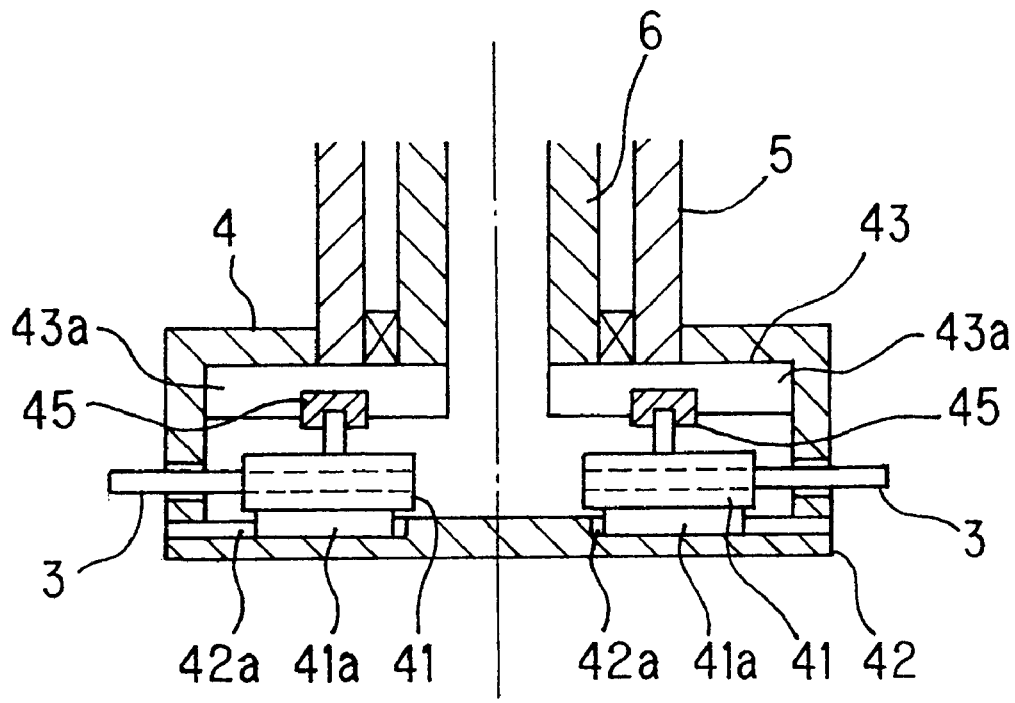
FIG. 4 is a sectional view of the nozzle displacement device according to the embodiment of this invention.

Referring to FIGS. 3 and 4, this nozzle displacement device 40 comprises a guide plate 42 which slidably guides the nozzle 3 substantially radially relative to the Z axis, a cam plate 43, a traverse shaft 6, and a traverse shaft rotating mechanism 50. The cam plate 43 moves each nozzle 3 substantially radially relative to the Z axis due to its rotation. The cylindrical traverse shaft 6 supports this cam plate 43 and penetrates the head support shaft 5. The traverse shaft rotating mechanism 50 rotates the traverse shaft 6. Due to the relative rotation of the traverse shaft 6 with respect to the head support shaft 5, the cam plate 43 rotates relative to the guide plate 42, and accordingly each nozzle 3 moves substantially radially relative to the Z axis.

The nozzle displacement device 40 has a construction comprising the guide plate 42 which guides the nozzle 3 such that it can slide substantially radially relative to the Z axis, the cam plate 43 which displaces each of the nozzles 3 substantially relative to the Z axis due to its rotation, the traverse shaft 6 which supports the cam plate 43 and penetrates the head support shaft 5, and the traverse shaft rotating mechanism 50 which rotates the traverse shaft 6. For this reason, it is not necessary to support a traverse shaft rotation motor 54 which rotates the cam plate 43 on the head 4. Moreover, as the motor is not attached to the head 4, the head 4 can be made compact and can also accommodate a small stator 8.

Three wires 2 are supplied via a tension device from a wire supply source, not shown, and each wire is led to each of the nozzles 3 on the inner side of the traverse shaft 6.

A disk-like guide plate 42 is fixed to the head support shaft 5 via the head 4, and three guide slots 42*a* are formed extending substantially radially relative to the Z axis. The guide slots 42*a* extend radially at intervals of 120 degrees.

The disk-like cam plate 43 is fixed to the traverse shaft 6, and is housed such that it can rotate inside the head 4. The cam plate 43 has three cam grooves 43*a* extending in a spiral shape. Each of the cam grooves 43*a* extends curved radially from the center part of the cam plate 43.

The tube-like nozzle 3 is fixed to a nozzle holder 41. This nozzle holder 41 has a slide part 41 a slidably engaging with the guide slot 42*a* and a roller-shaped cam follower 45 engaging with the cam groove 43*a*. When the cam plate 43 rotates relative to the guide plate 42, each of the cam followers 45 moves along the spiral cam groove 43*a*. Hence, the nozzle holder 41 moves substantially radially along the guide slot 42*a*.

The traverse shaft rotating mechanism 50 comprises the spline 51 cut into the perimeter of the traverse shaft 6, the gear 52 slidably engaging with this spline 51, the pinion 53 meshing with this gear 52, and the traverse shaft rotation motor 54 rotating the pinion 53. The rotation of the traverse shaft rotation motor 54 is transmitted to the traverse shaft 6, and as a result the cam plate 43 rotates. The traverse shaft rotation motor 54 is fixed to the frame 12. On the other hand, the gear 52 is supported by the frame 12 via a bearing 55 so that the gear 52 meshes with the pinion 53.

The traverse shaft rotating mechanism 50 has a configuration wherein the rotation of the traverse shaft rotation motor 54 is transmitted to the traverse shaft 6 via the gear 52 with which the spline 51 of the traverse shaft 6 slidably engages. This configuration allows the traverse shaft rotation motor 54 to be supported by the frame 12.

Due to the support of the traverse shaft rotation motor 54 by the frame 12, compared with the configuration of the prior art wherein the motor which rotates the cam plate is supported by the head, the moving mass containing the head 4 is sharply reduced. Consequently, the traveling speed of the head 4 is increased and the working time required to wind the wire can be shortened.

As mentioned above, as each of the motors 24, 32 and 54 are fixed to the frame 12, the leads for energizing the motors can be fixed and there is no concern about the leads becoming disconnected.

The coil winder 1 comprises a controller having a microprocessor (not shown) which controls the operation of each of the servo-motors 24, 32, 54. This controller commands the head support shaft rotation motor 24 to rotate in synchronism with the traverse shaft rotation motor 54 in order to rotate the head 4.

As a result, the head support shaft 5 and the traverse shaft 6 rotate at the same speed and in the same direction. On the other hand, in order to move the nozzle 3 substantially radially, the controller stops rotation of the head support shaft rotation motor 24, and the traverse shaft 6 is rotated relative to the head support shaft 5 by rotating only the traverse shaft rotation motor 54. Also, the head support shaft rotation motor 24 and the traverse shaft rotation motor 54 are rotated relative to each other continuously and with a slight speed difference so that the nozzle 3 moves the distance of the outer-diameter of the wire substantially radially when the nozzle performs one rotation around the core 8*a*.

The coil winder 1 performs the following procedure in order to wind the wire 2 around the core 8*a*.

(1) A wire clamp mechanism of the coil winder 1, not shown, holds the tip of the wire 2 fed out from the nozzle 3.

(2) The coil winder 1 lowers the head 4 inside the stator 8, and thus moves the nozzle 3 near the core 8*a*.

(3) By moving the head 4 in the Z axis direction, and rotating it around the Z axis, the coil winder 1 rotates the nozzle 3 around the core 8*a*, and winds the wire 2 fed out from the nozzle 3 once around the core. More specifically, this operation is performed by the following steps.

(i) By rotating the head support shaft displacement motor 32, the coil winder 1 lowers the nozzle 3 alongside the core 8*a* together with the head 4.

(ii) By rotating the head support shaft rotation motor 24 and the traverse shaft rotation motor 54 in synchronism in the same direction, the coil winder 1 rotates the head 4 while rotating the head support shaft 5 and traverse shaft 6 at the same speed and in the same direction, and thus moves the nozzle 3 in the circumferential direction along the core 8a.

(iii) The coil winder 1 rotates the head support shaft displacement motor 32 in the opposite direction to step (i) above, and raises the nozzle 3 along the core 8a together with the head 4.

(iv) By rotating the head support shaft rotation motor 24 and traverse shaft rotation motor 44 in synchronism in the opposite direction to step (ii) above, the coil winder 1 rotates the head support shaft 5 and the traverse shaft 6 at the same speed and in the same direction. Thus the coil winder 1 moves the nozzle 3 in the circumferential direction opposite to step (ii) along the core 8a by rotating the head 4, and makes the nozzle 3 rotate once the core 8a.

(4) By stopping rotation of the head support shaft rotation motor 24, and rotating only the traverse shaft rotation motor 44, the coil winder 1 rotates the traverse shaft 6 relative to the head support shaft 5. Hence, the cam plate 43 rotates relative to the guide plate 42, and each of the nozzles 3 moves substantially radially relative to the Z axis. Thus, by moving the nozzle 3 the distance of the outer-diameter of the wire 2 substantially radially relative to the Z axis, the coil winder 1 prevents the misalignment of the wire turns and the gaps being generated between adjacent wire turns.

(5) By repeating the above operations (3) and (4), the coil winder 1 winds the wire 2 in alignment with the core 8a, and winds the wire in the desired depth and in the desired number of layers to form the coil.

(6) After the wire has been wound the desired number of times, the wire clamp mechanism releases the wire 2.

(7) After the winding of one of the cores 8a is complete, the coil winder 1 pulls the head 4 up from the inner side of the stator 8, and the stator support base 11 is rotated through the predetermined angle (for example the angle between the cores 8a) by the indexing motor 13.

(8) After the coil winder 1 lowers the head 4 inside the stator 8, it repeats the above-mentioned operation to wind the wire 2 around the following core 8a.

(9) After the winding wire of all the cores 8a is complete, the coil winder 1 pulls the head 4 up from the inside of the stator 8, and the coil winder 1 cuts the wire 2 between the core 8a and the wire clamp mechanism by a cutting apparatus, not shown, while the middle of the wire 2 is held by the wire clamp mechanism.

(10) After the stator 8 is subsequently removed from the stator support base 11, another stator 8 is attached to the stator support base 11, and wire winding is started again.

Although the invention has been described above by reference to certain embodiments of the invention, the invention is not limited to the embodiments described above.

For example, the number of the nozzles 3 attached to one of the head 4 is not limited to three, and the number may be increased or decreased according to specification.

The nozzle displacement device 40 is not limited to the construction using the cam plate 43, and may be provided with a link mechanism or the like which links the traverse shaft 6 and nozzle holders 41. In this case, a link mechanism may cause the nozzle holder 41 to slide by the relative rotation of the traverse shaft 6 with respect to the head support shaft 5.

The head support shaft may be disposed on the inner side of the traverse shaft. In other words, the arrangement of the traverse shaft and head support shaft may be one in which one of the shafts passes through the other.

Further, the traverse shaft may be joined to the guide plate of the nozzle displacement mechanism, and the head support shaft may likewise be connected to the cam plate. In this case, the cam plate is fixed to the head, and the guide plate rotates relative to the head.

Modifications and variations of the embodiments described above will occur to those skilled in the art, in light of the above teachings. The scope of the invention is defined with reference to the following claims.

The entire contents of Japanese Patent Applications P2001-1522 (filed Jan. 9, 2001) are incorporated herein by reference.

What is claimed:

1. A coil winder, comprising:
    a frame,
    a nozzle for supplying a wire,
    a head for supporting the nozzle in such a manner that the nozzle can move radially relative to the rotation axis of the head,
    a head support shaft which supports the head and extends in the rotation axis direction,
    a head support shaft displacement mechanism for moving the head support shaft to and fro in the rotation axis direction relative to the frame,
    a first rotating mechanism for rotating the head support shaft around the rotation axis, the first rotating mechanism having a first motor supported by the frame,
    a traverse shaft which rotates relative to the head support shaft,
    a second rotating mechanism for rotating the traverse shaft around the rotation axis, the second rotating mechanism having a second motor supported by the frame, and
    a nozzle displacement device for moving the nozzle radially relative to the rotation axis due to the rotation of the traverse shaft relative to the head support shaft.

2. The coil winder as defined in claim 1, wherein
    the first rotating mechanism further comprises a spline cut into the outer circumference of the head support shaft,
    a first gear with which the spline of the head support shaft slidably engages, and
    a first pinion engaging with the first gear;
    wherein the first motor rotates the first pinion, and the rotation of the first motor is transmitted to the head support shaft.

3. The coil winder as defined in claim 1, wherein
    the second rotating mechanism further comprises a spline cut into the outer circumference of the traverse shaft,
    a second gear with which the spline of the traverse shaft slidably engages, and
    a second pinion engaging with the second gear,
    wherein the second motor rotates the second pinion, and the rotation of the second motor is transmitted to the traverse shaft.

4. The coil winder as defined in claims 1, wherein
    the nozzle displacement device comprises:
        a guide plate which slidably guides the nozzle radially relative to the rotation axis, and is connected to the head support shaft, and a cam plate which moves the nozzle radially relative to the rotation axis due to its rotation, and is connected to the traverse shaft, wherein the nozzle moves radially relative to the rotation axis due to the relative rotation of the traverse shaft with respect to the head support shaft.

5. A wire winding method of a coil winder, the coil winder having a frame, a nozzle for feeding out a wire, a head for supporting the nozzle free to move radially relative to the rotation axis of the head, a head support shaft which supports the head and extends in the rotation axis direction, the head support shaft being rotated by the rotation of a first motor supported by the frame, a head support shaft displacement mechanism for moving the head support shaft to and fro in the rotation axis direction relative to the frame, a traverse shaft which rotates relative to the head support shaft, the traverse shaft being rotated by the rotation of a second motor supported by the frame, and a nozzle displacement device for moving the nozzle radially relative to the rotation axis due to the relative rotation of the traverse shaft with respect to the head support shaft;

the wire winding method comprising:

axially moving the head downwards, rotating the head support shaft and traverse shaft at the same speed in a first direction, axially moving the head upwards, rotating the head support shaft and traverse shaft at the same speed and in the opposite direction to the first direction, and rotating the traverse shaft with the head support shaft stopped so as to move the nozzle radially relative to the rotation axis.

* * * * *